United States Patent
Park et al.

(10) Patent No.: US 11,142,150 B2
(45) Date of Patent: Oct. 12, 2021

(54) APPARATUS FOR MANAGING POWER OF VEHICLE AND METHOD OF CONTROLLING THE SAME

(71) Applicants: HYUNDAI MOTOR COMPANY, Seoul (KR); KIA MOTORS CORPORATION, Seoul (KR); YURA CORPORATION CO., LTD., Seongnam-si (KR)

(72) Inventors: Sang Wook Park, Hwaseong-si (KR); Chan Young Jung, Seongnam-si (KR); Sang Yeon Kim, Seoul (KR)

(73) Assignees: HYUNDAI MOTOR COMPANY, Seoul (KR); KIA MOTORS CORPORATION, Seoul (KR); YURA CORPORATION CO., LTD., Seongnam-si (KR)

( * ) Notice: Subject to any disclaimer, the term of this patent is extended or adjusted under 35 U.S.C. 154(b) by 115 days.

(21) Appl. No.: 16/664,047

(22) Filed: Oct. 25, 2019

(65) Prior Publication Data

US 2020/0369227 A1    Nov. 26, 2020

(30) Foreign Application Priority Data

May 21, 2019    (KR) .......................... 10-2019-0059205

(51) Int. Cl.
*B60R 16/03*    (2006.01)
*H02M 3/155*    (2006.01)
*H02M 1/36*    (2007.01)
*H02M 1/08*    (2006.01)

(52) U.S. Cl.
CPC ............... *B60R 16/03* (2013.01); *H02M 1/08* (2013.01); *H02M 1/36* (2013.01); *H02M 3/155* (2013.01)

(58) Field of Classification Search
CPC ........... B60R 16/03; H02M 1/08; H02M 1/36; H02M 3/155
USPC ................................................... 307/9.1, 10.1
See application file for complete search history.

(56) References Cited

U.S. PATENT DOCUMENTS

| | | | |
|---|---|---|---|
| 5,530,946 A * | 6/1996 | Bouvier | G06F 11/0757 714/13 |
| 10,297,406 B2 | 5/2019 | Kim et al. | |
| 2013/0200699 A1 * | 8/2013 | Origane | H02J 1/04 307/10.6 |
| 2017/0267111 A1 * | 9/2017 | Ochi | H02J 7/022 |

(Continued)

FOREIGN PATENT DOCUMENTS

| | | |
|---|---|---|
| KR | 10-0851147 B1 | 8/2008 |
| KR | 10-0993587 B1 | 11/2010 |

(Continued)

*Primary Examiner* — Michael R. Fin
(74) *Attorney, Agent, or Firm* — Morgan, Lewis & Bockius LLP

(57) ABSTRACT

An apparatus for managing power of a vehicle includes a processor that controls a bypass path for bypassing an input power or a boosting path for boosting the input power corresponding to an idle mode signal, a booster that boosts the input power corresponding to a driving signal to generate an output power, a control circuit that selectively supplies a power for operating the booster corresponding to an output signal of the processor in a boost mode, and a pulse width control circuit that controls a duty of the driving signal corresponding to an output signal of the control circuit.

19 Claims, 6 Drawing Sheets

(56) References Cited

U.S. PATENT DOCUMENTS

2018/0005789 A1    1/2018   Kim et al.
2018/0364284 A1   12/2018   Kim et al.

FOREIGN PATENT DOCUMENTS

| KR | 10-2011-0097241 A | 8/2011 |
| --- | --- | --- |
| KR | 10-2013-0025528 A | 3/2013 |
| KR | 10-1254612 B1 | 4/2013 |
| KR | 10-1379393 B1 | 3/2014 |
| KR | 10-1485730 A | 1/2015 |
| KR | 10-2015-0046652 A | 4/2015 |
| KR | 10-2016-0047807 A | 5/2016 |
| KR | 10-2017-0110308 A | 10/2017 |
| KR | 10-2017-0124778 A | 11/2017 |
| KR | 10-1786362 B1 | 11/2017 |
| KR | 10-1804462 B1 | 12/2017 |
| KR | 10-2018-0043583 A | 4/2018 |
| KR | 10-1883931 B1 | 8/2018 |

\* cited by examiner

APPARATUS FOR MANAGING POWER OF VEHICLE AND METHOD OF CONTROLLING THE SAME

CROSS-REFERENCE TO RELATED APPLICATION

This application claims the benefit of priority to Korean Patent Application No. 10-2019-0059205, filed on May 21, 2019 in the Korean Intellectual Property Office, the entire contents of which are incorporated herein by reference.

TECHNICAL FIELD

The present disclosure relates to an apparatus for managing power of a vehicle and a method of controlling the same, and more particularly, to a technology for implementing an integrated power management apparatus to efficiently manage a power source and to enhance space utilization in a vehicle.

BACKGROUND

In general, a vehicle is provided with a fuse box equipped with a fuse for protecting a circuit from a power source supplied to various electric devices. However, in recent years, in addition to a general fuse box function, a micro control unit (MCU) for controlling operation times of various relay circuits and some electric devices is installed in a vehicle so that a smart junction box (SJB) having a multi-function is widely used.

A power management apparatus that manages the power supply of a vehicle receives voltage information from a battery to supply or cut off the power to various loads in the vehicle. Such a power management apparatus may be an integrated control unit (ICU) or an integrated gateway and power control module (IGPM).

In addition, the power management apparatus further includes a low voltage DC-DC converter (LDC) in addition to the integrated control apparatus and smart junction box described above. The low-voltage DC-DC converter may be provided to compensate for a decrease of a battery voltage supplied to the vehicle. The low-voltage DC-DC converter may be located at a passenger seat, a trunk of a vehicle, and the like.

SUMMARY

The present disclosure has been made to solve the above-mentioned problems occurring in the prior art while advantages achieved by the prior art are maintained intact.

According one aspect of the present disclosure, an apparatus for managing power of a vehicle is implemented integrally with the function of a low-voltage DC-DC converter to efficiently manage power and is capable of increasing space utilization in the vehicle.

The technical problems to be solved by the present inventive concept are not limited to the aforementioned problems, and any other technical problems not mentioned herein will be clearly understood from the following description by those skilled in the art to which the present disclosure pertains.

According to one aspect of the present disclosure, an apparatus for managing power of a vehicle includes a processor that controls a bypass path for bypassing an input power or a boosting path for boosting the input power corresponding to an idle mode signal, a booster that boosts the input power corresponding to a driving signal to generate an output power, a control circuit that selectively supplies a power for operating the booster corresponding to an output signal of the processor in a boost mode, and a pulse width control circuit that controls a duty of the driving signal corresponding to an output signal of the control circuit.

According to another aspect of the present disclosure, a method of managing power of a vehicle includes supplying an output power to a load of the vehicle corresponding to an input power in a bypass mode, terminating the bypass mode and activating a boost mode when an idle mode signal is activated and the input power is less than a specified voltage, and terminating the boost mode and activating the bypass mode when the input power is equal to or higher than the specified voltage.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
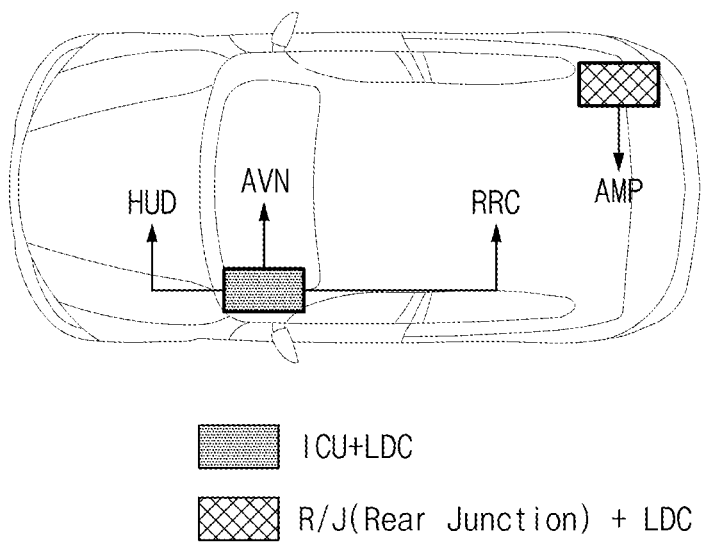
FIG. 1 is a view illustrating a concept of an apparatus for managing power of a vehicle according to an exemplary embodiment of the present disclosure.

Hereinafter, exemplary embodiments of the present disclosure will be described in detail with reference to the accompanying drawings. Throughout the specification, it is noted that the same or like reference numerals denote the same or like components even though they are provided in different drawings. Further, in the following description of the present disclosure, a detailed description of known functions and configurations incorporated herein will be omitted when it may make the subject matter of the present disclosure rather unclear.

FIG. 1 is a view illustrating a concept of an apparatus for managing power of a vehicle according to an exemplary embodiment of the present disclosure.

Referring to FIG. 1, an exemplary embodiment of the present disclosure may be applied to an integrated control unit (ICU) or a smart junction box (SJB).

In this case, the ICU may control a head up display (HUD), an audio video navigation (AVN) terminal, a rear remote control (RRC), and the like. In addition, the SJB may control an amplifier and the like in the rear.

An exemplary embodiment of the present disclosure may be implemented in the form of a module in which the functions of an ICU and a low voltage DC-DC converter (LDC) are integrated. For example, a power management apparatus in which the functions of the ICU and the LDC are integrated may be located near the driver seat of the vehicle.

Another exemplary embodiment may be implemented in the form of a module in which the functions of the SJB and the LDC are integrated. In this case, the smart junction box may represent a rear junction box (R/J) provided at the rear of the vehicle. For example, a power management apparatus in which the functions of the smart junction box and the low-voltage DC-DC converter (LDC) are integrated may be located in a trunk or the like of a vehicle.

As described above, the exemplary embodiment of the present disclosure may be implemented in an integrated form of the functions of the power management apparatus and the low voltage DC-DC converter (LDC) to efficiently manage the power and increase the space utilization of the vehicle.

The exemplary embodiment of the present disclosure has been described by way of example in which the power management apparatus is applied to an integrated control unit (ICU) and a smart junction box. However, the power management apparatus according to an exemplary embodiment of the present disclosure may be applied to an 'integrated gateway & power control module (IGPM), which is a power management module integrated with a gateway, or another type of a power management apparatus.

Figure 2:
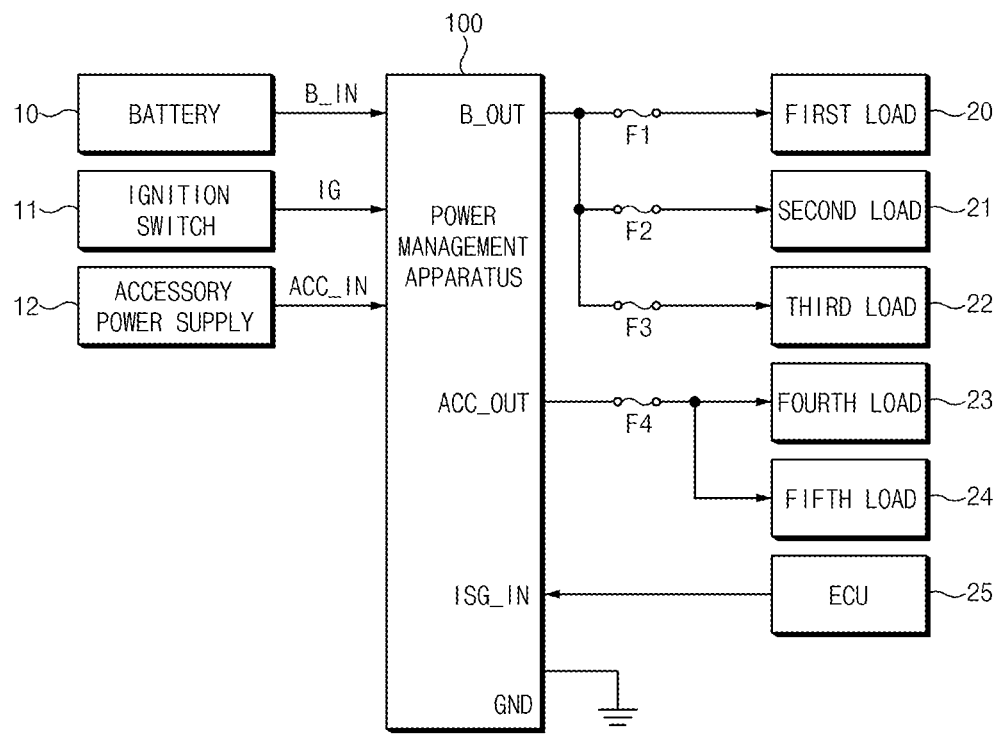
FIG. 2 is a view illustrating a configuration of an apparatus for managing power of a vehicle according to an exemplary embodiment of the present disclosure.

FIG. 2 is a view illustrating a configuration of an apparatus for managing power of a vehicle according to an exemplary embodiment of the present disclosure. In FIG. 2, an exemplary embodiment in which the power management apparatus is applied to an integrated control unit (ICU) will be described.

Referring to FIG. 2, a power management apparatus 100 according to an exemplary embodiment of the present disclosure manages a input power B_IN applied from a battery 10 to supply a output power B_OUT to a plurality of loads 20 to 22. In this case, the input power B_IN represents a power that is always supplied to the vehicle.

In addition, the power management apparatus 100 receives an ignition signal IG from an ignition switch 11. The power management apparatus 100 may sense a state in which power is supplied to all electric components of the vehicle corresponding to the ignition signal IG.

For example, the ignition signal IG means a signal necessary for starting and operating, and is a signal related to operations of an engine, an automatic transmission, a brake, and the like. According to another exemplary embodiment of the present disclosure, the ignition signal IG may mean an operation signal of the devices incidental to the vehicle operation. For example, the ignition signal IG is a signal related to operations of a wiper, an air conditioner, a sunroof, and the like.

In addition, the power management apparatus 100 receives a power signal ACC_IN from an accessory power supply 12. The power management apparatus 100 manages the power in response to the power signal ACC_IN and supplies a power ACC_OUT to the loads 23 and 24.

The power management apparatus 100 may determine whether there is a request signal from a driver corresponding to the power signal ACC_IN. In this case, the power signal ACC_IN means operation signals of built-in devices for convenience of a vehicle occupant. For example, the power signal ACC_IN corresponds to signals for applying power to an audio device, a cigar jack, a charging device, a voice input device, a navigation terminal, a display, a vehicle communicator, a speaker, and the like.

In addition, the power management apparatus 100 receives an idle stop & go (ISG) signal ISG_IN from an engine control unit (ECU) 25 for controlling the operation of the vehicle engine. In this case, the ISG signal ISG_IN refers to a signal activated in an idle mode. The idle mode means a mode for automatically stopping an idling engine at a stop such as waiting for light to improve fuel efficiency, and then restarting the engine when the vehicle is started. The power management apparatus 100 may determine whether the idle mode is entered based on the engine driving corresponding to the ISG signal ISG_IN.

The first to third loads 20 to 22 of the plurality of loads 20 to 24 are supplied with the output power B_OUT from the power management apparatus 100. Fuses F1 to F3 may be connected between the power management apparatus 100 and the loads 20 to 22 to protect the wiring of the vehicle. In this case, the fuse F1 may be connected between the power management apparatus 100 and the first load 20. The fuse F2 may be connected between the power management apparatus 100 and the second load 21. The fuse F3 may be connected between the power management apparatus 100 and the third load 22.

For example, the first load 20 may represent a navigation terminal. The second load 21 may represent a keyboard, a rear radio controller, a universal serial bus (USB) of a rear seat, a monitor, and the like. The third load 22 may represent wireless charging of front/rear seats, a head up display, a front/rear air conditioning controller, a cluster, a rear corner radar, and the like.

The power ACC_OUT is supplied from the power management apparatus 100 to the fourth and fifth loads 23 and 24 of the plurality of loads 20 to 24. The fuse F4 may be connected between the power management apparatus 100 and the fourth and fifth loads 23 and 24.

For example, the fourth load 23 may represent a navigation terminal, a keyboard, an all-seat wireless charging device, and the like. In addition, the fifth load 24 may represent a rear wireless controller, an around view monitoring (AVM) device, a rear view monitoring (RVM) device, and the like.

As described above, according to an exemplary embodiment of the present disclosure, by integrating the functions of the ICU and the low-voltage DC-DC converter (LDC) into the one power management apparatus 100, so that the number of wires connected to each unit may be reduced compared with that of the related art.

Figure 3:
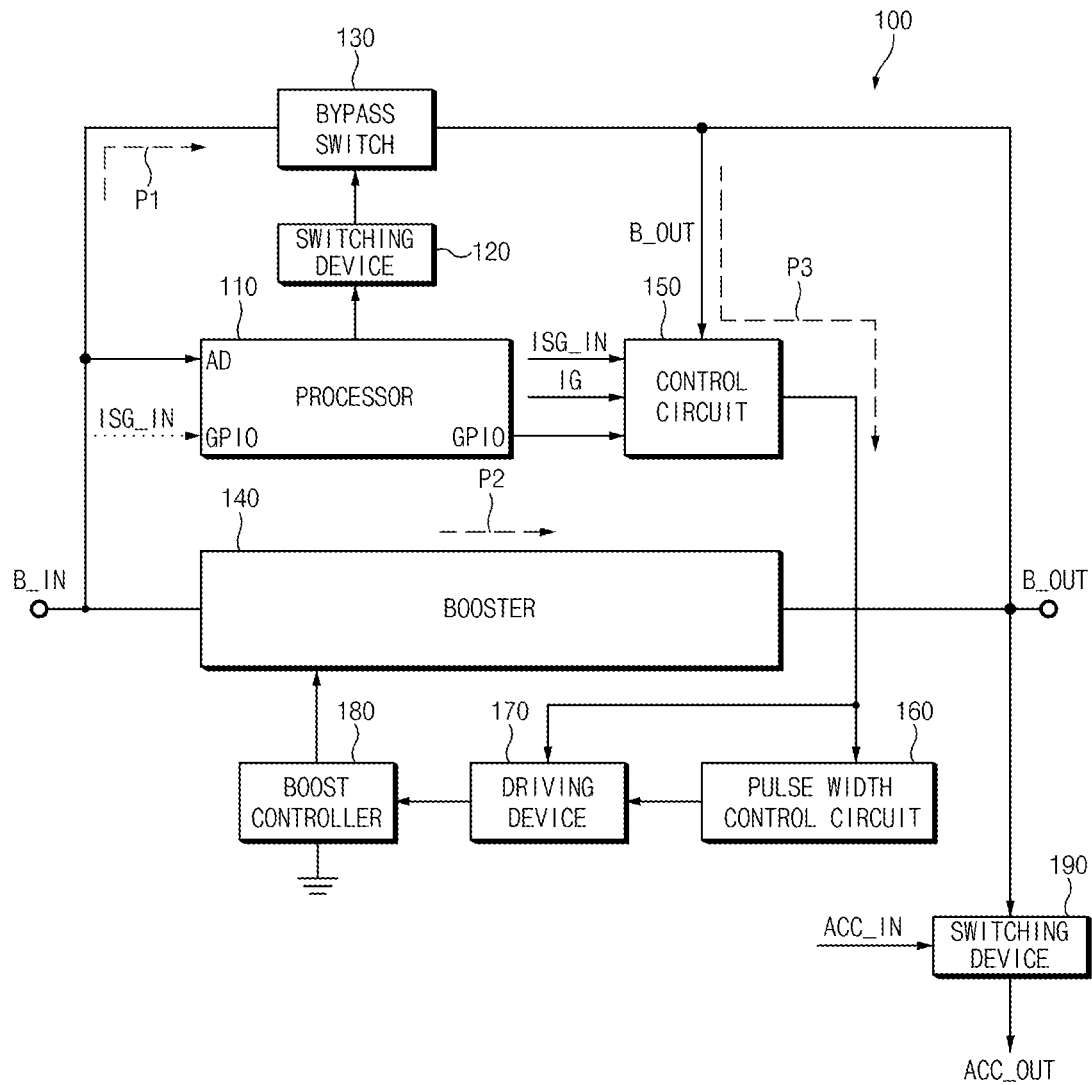
FIG. 3 is a view illustrating a detailed configuration of the power management apparatus of FIG. 2.

FIG. 3 is a view illustrating a detailed configuration of the power management apparatus 100 of FIG. 2.

Referring to FIG. 3, the power management apparatus 100 includes a processor 110, a switching device 120, a bypass switch 130, a booster 140, a control circuit 150, a pulse width control circuit 160, a driving device 170, a boost controller 180, and a switching device 190.

Each of the control circuit 150, the pulse width control circuit 160, and the boost controller 180 may be an electric circuitry that executes instructions of software which thereby performs various functions described hereinafter.

The processor 110 controls the operations of the switching device 120 and the control circuit 150 corresponding to the input power B_IN and the ISG signal ISG_IN. In this case, the processor 110 may include a central processing unit (CPU), a microcontroller unit (MCU), a microprocessor (Micom or microprocessor), an application processor (AP), an electronic control unit (ECU), and/or other electronic devices capable of processing various arithmetic operations and generating control signals.

The input power B_IN is applied to the processor 110 through an AD terminal. The processor 110 inputs and outputs the ISG signal ISG_IN through a general purpose input output (GPIO) terminal for inputting and outputting data. The processor 110 outputs a control signal to the control circuit 150 through the GPIO terminal.

The processor 110 controls the switching device 120 to form a bypass path P1 when the ISG signal ISG_IN is inactive (when the ISG mode is not entered). Furthermore, the processor 110 operates in a boost mode when the ISG signal ISG_IN is in an active state (when the ISG mode is entered).

The processor 110 blocks the bypass path P1 in the boost mode and allows a boost path P2 to be formed. The processor 110 terminates the boost mode when the input power B_IN reaches a certain voltage or higher.

The switching device 120 controls whether the bypass switch 130 operates under control of the processor 110. For example, the switching device 120 generates a switching signal for connecting the bypass switch 130 when the ISG signal ISG_IN is inactive in the bypass mode. Moreover, the switching device 120 generates a switching signal for blocking the bypass switch 130 when the ISG signal ISG_IN is active in the boost mode.

The bypass switch 130 selectively controls the bypass path P1 corresponding to the switching signal of the switching device 120. For example, the bypass switch 130 allows the bypass path P1 to be formed corresponding to the switching signal of the switching device 120 when the ISG signal ISG_IN is inactive. When the bypass path P1 is formed, the input power B_IN is directly supplied to the output power B_OUT. That is, the bypass switch 130 selectively connects the input power B_IN and the output power B_OUT. Furthermore, when the ISG signal ISG_IN is active, the bypass switch 130 blocks the bypass path P1 corresponding to the switching signal of the switching device 120.

The booster 140 (e.g., a DC-DC power converter, etc.) boosts the voltage level of the input power B_IN under the control of the boost controller 180 in the boost mode. Accordingly, the booster 140 boosts the voltage level to supply the output power B_OUT of a certain voltage level or higher when the voltage of the input power B_IN drops.

The control circuit 150 selectively supplies the output power B_OUT corresponding to the control signal applied from the processor 110 and the ISG signal ISG_IN in the boost mode. The control circuit 150 forms a path P3 in the boost mode such that it is possible to normally supply power to the pulse width control circuit 160 and the driving device 170. Furthermore, the control circuit 150 may block the path P3 in the bypass mode such that it is possible to prevent power from being supplied to the pulse width control circuit 160 and the driving device 170.

The control circuit 150 performs a fail-safe function when a failure occurs in the processor 110 in the boost mode. In this case, the control circuit 150 may determine that the processor 110 fails when the output signal from a control port of the processor 110 is not applied for a specified time or the output signal is continuously output for a specified time or more.

The bypass mode and the boost mode are activated complementarily with each other. In other words, the bypass path P1 and the boost path P2 may not be activated at the same time. Thus, when the bypass mode is entered, the boost mode must be terminated.

However, when a short circuit or a failure occurs in the processor 110, an error may occur that the processor 110 is not driven and continues to operate in the boost mode. In this case, the elements in the booster 140 may be damaged due to an excessive boosting operation. Accordingly, the control circuit 150 protects the elements of the booster 140 by cutting off the power supplied to the pulse width control circuit 160 and the driving device 170 when the processor 110 fails.

In addition, the control circuit 150 may reduce a dark current by cutting off the power supplied to the pulse width control circuit 160 and the driving device 170 in the sleep mode in which the vehicle is turned off. For example, when the ignition signal IG is inactive for a specified period of time, the control circuit 150 may determine that the mode is a sleep mode and cut off the power supplied to the pulse width control circuit 160 and the driving device 170.

The pulse width control circuit 160 performs a pulse width modulation (PWM) operation under the control of the control circuit 150 to generate a drive control signal. The pulse width control circuit 160 may control the duty of the drive control signal provided to the driving device 170 to stably generate the pulse of the drive control signal.

The driving device 170 provides the voltage of the control circuit 150 to the boost controller 180 in response to the drive control signal of the pulse width control circuit 160. The boost controller 180 controls the boosting operation of the booster 140 corresponding to the output signal of the driving device 170.

The switching device 190 receives the power signal ACC_IN from the accessory power supply 12. Then, the switching device 190 provides the power ACC_OUT to the loads 23 and 24 when the power signal ACC_IN is input. The power ACC_OUT output from the switching device 190 may be adjusted corresponding to the level of the output power B_OUT.

Figure 4:
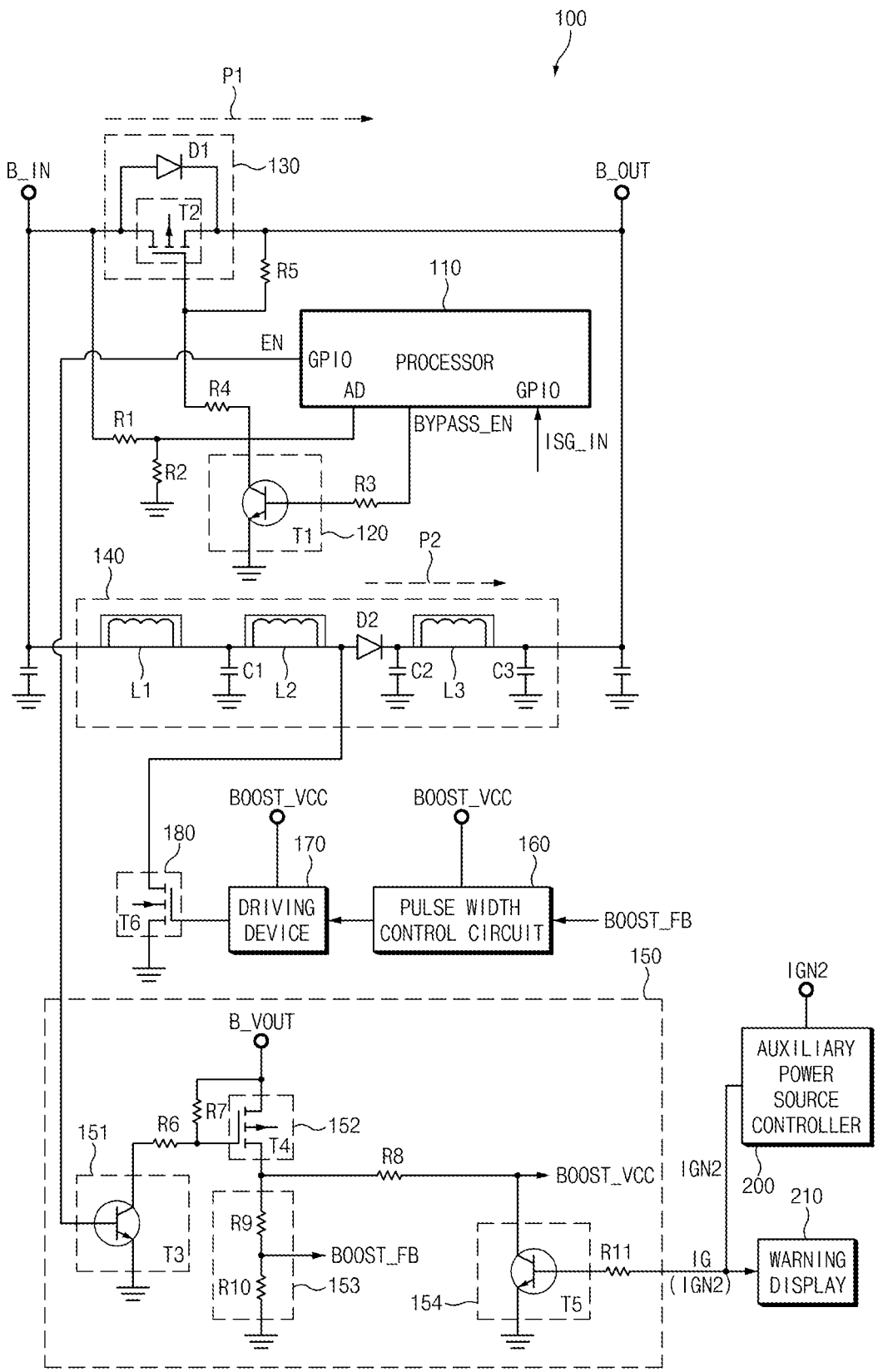
FIG. 4 is a detailed circuit diagram of the power management apparatus of FIG. 3.

FIG. 4 is a detailed circuit diagram of the power management apparatus 100 of FIG. 3.

Referring to FIG. 4, the processor 110 is connected to the application terminal of the input power B_IN through a resistor R1. A resistor R2 is connected in parallel with the resistor R1. The processor 110 receives the idle mode signal ISG_IN through a GPIO terminal. In addition, the processor 110 outputs a control signal EN to the control circuit 150 through a GPIO terminal.

When the idle mode signal ISG_IN is inactive, the processor 110 determines that the mode is the bypass mode and activates the bypass enable signal BYPASS_EN. On the other hand, when the idle mode signal ISG_IN is active, the processor 110 determines that the mode is the boost mode and activates the control signal EN.

For example, the processor 110 activates the bypass enable signal BYPASS_EN for controlling the bypass path P1 in the bypass mode, and outputs the bypass enable signal BYPASS_EN to the switching device 120. Furthermore, the processor 110 activates the control signal EN for controlling the boost path P2 in the boost mode and outputs the control signal EN to the control circuit 150.

The switching device 120 is connected to the processor 110 through a resistor R3. The switching device 120 is selectively turned on corresponding to the bypass enable signal BYPASS_EN.

The switching device 120 may include an NPN type bipolar junction transistor T1. The transistor T1 is connected between a resistor R4 and a ground voltage terminal, and the base terminal is connected to the resistor R3.

The switching device 120 is turned on in the bypass mode and generates a switching signal for connecting the bypass switch 130. On the other hand, the switching device 120 is turned off in the boost mode and generates a switching signal for cutting off the bypass switch 130.

The bypass switch 130 is selectively turned on corresponding to the switching signal of the switching device 120 to control the bypass path P1. The bypass switch 130 is connected to the switching device 120 through the resistor R4.

The bypass switch 130 may include a PMOS type field effect transistor (FET) T2 and a diode D1. In this case, the transistor T1 is connected between the input terminal of the input power B_IN and the output terminal of the output power B_OUT, and the output signal of the switching device 120 is applied through the gate terminal. In addition, the diode D1 is connected in parallel with the transistor T2.

The bypass switch 130 is turned on corresponding to the switching signal of the switching device 120 in the bypass mode to connect the bypass path P1. When the bypass path P1 is formed, the input power B_IN is bypassed to the output power B_OUT. On the other hand, the bypass switch 130 is turned off corresponding to the switching signal of the switching device 120 in the boost mode to cut off the bypass path P1.

The booster 140 operates under the control of the boost controller 180 in the boost mode to boost the input power B_IN up to a specified voltage level. The booster 140 includes a plurality of inductors L1 to L3, a plurality of capacitors C1 to C3, and a diode D2.

In this case, the plurality of inductors L1 to L3 are connected in series between the input terminal of the input power B_IN and the output terminal of the output power B_OUT, so that the boost path P2 is formed. In addition, the plurality of capacitors C1 to C3 are connected between the connection terminals of the plurality of inductors L1 to L3 and the ground voltage terminal. The plurality of capacitors C1 to C3 smooth the boosted voltage on the boost path P2. The diode D2 is connected between the inductor L2 and the inductor L3 to rectify the voltage applied onto the boost path P2.

In addition, the control circuit 150 includes a driving controller 151, a driving device 152, a resistance distribution device 153, and a power blocking device 154.

In this case, the driving controller 151 selectively operates corresponding to the control signal EN in the boost mode. The driving controller 151 may be connected to the driving device 152 through a resistor R6.

The driving controller 151 may include an NPN-type bipolar junction transistor T3. The transistor T3 is connected between the resistor R6 and the ground voltage terminal and the control signal EN is applied through the base terminal.

For example, when the control signal EN is activated, the driving controller 151 is turned on to generate a signal for driving the driving device 152. On the other hand, when the control signal EN is inactivated, the driving controller 151 is turned off to prevent the driving device 152 from operating.

The driving device 152 is selectively driven corresponding to the output signal of the driving controller 151. The input terminal of the driving device 152 may be connected to a resistor R7. In addition, the driving device 152 outputs the boost voltage BOOST_VCC through a resistor R8.

The driving device 152 may include a PMOS-type field effect transistor (FET) T4. The transistor T4 is connected between the output terminal of the output power B_OUT and the resistance distribution device 153, and the gate terminal is connected to the resistor R6.

For example, when the output of the driving controller 151 is activated, the driving device 152 is turned on to supply the boost voltage BOOST_VCC corresponding to the output power B_OUT. On the other hand, the driving device 152 is turned off when the output of the driving controller 151 is inactivated. Thus, the driving controller 151 may stop the supply of the boost voltage BOOST_VCC to reduce the dark current.

The resistance distribution device 153 generates a distribution voltage BOOST_FB by resistance-dividing the boost voltage BOOST_VCC. The resistance distribution device 153 includes resistors R9 and R10. The resistance distribution device 153 generates the distribution voltage BOOST_FB corresponding to the resistance distribution values of the resistors R9 and R10.

The power blocking device 154 is selectively driven by the ignition signal IG to selectively supply the boost voltage BOOST_VCC. The power blocking device 154 receives the ignition signal IG through a resistor R11.

The power blocking device 154 may include an NPN type bipolar junction transistor T5. The transistor T5 is connected between the output terminal of the boost voltage BOOST_VCC and the ground voltage terminal, and the ignition signal IG is applied thereto through the base terminal.

For example, the power blocking device 154 is turned on when the ignition signal IG is activated in the sleep mode of the vehicle. Then, the power blocking device 154 operates to pull down the boost voltage BOOST_VCC to the ground voltage level. Accordingly, the power blocking device 154 may perform the fail-safety function by cutting off the power supplied to the pulse width control circuit 160 and the driving device 170 in the sleep mode.

On the other hand, the power blocking device 154 is turned off when the ignition signal IG is inactivated. Accordingly, the boost voltage BOOST_VCC may be normally supplied to the pulse width control circuit 160 and the driving device 170.

The pulse width control circuit 160 performs a pulse width modulation operation in accordance with the boost voltage BOOST_VCC. The pulse width control circuit 160 performs a pulse width control operation until the power supply B_OUT is boosted to a predetermined voltage (for example, 12V) corresponding to the distribution voltage BOOST_FB.

The driving device 170 selectively supplies the boost voltage BOOST_VCC to the boost controller 180 corresponding to the drive control signal of the pulse width control circuit 160. In addition, the boost controller 180 controls the boosting operation of the booster 140 corresponding to the output signal of the driving device 170.

The boost controller 180 may include an NMOS-type field effect transistor (FET) T6. The transistor T6 is connected between the booster 140 and the ground voltage terminal, and the gate terminal is connected to the driving device 170.

For example, the boost controller 180 may be turned on corresponding to the output signal of the driving device 170 to control the booster 140 to be activated. On the other hand, the boost controller 180 may be turned off corresponding to the output signal of the driving device 170 to control the booster 140 to be inactivated.

In addition, an auxiliary power source controller 200 may supply an auxiliary power IGN2 to each unit of the vehicle. That is, the power management apparatus distributes the power of the vehicle or provides constant power to the lamp.

However, when an error occurs in the power management apparatus, the lamp may not be driven. Accordingly, the auxiliary power source controller 200 may sense the failure of the processor 110 and supply the auxiliary power IGN2 to the lamp.

The auxiliary power source controller 200 senses the output signal of the processor 110 and determines that the processor 110 is in a fail mode when any signal is not output from a port for a specified time or an output signal is continuously output for the specified time or more. Thus, the auxiliary power source controller 200 may supply the auxiliary power IGN2 to the power blocking device 154 to control the power blocking device 154 to be turned off when the processor 110 fails.

The auxiliary power source controller 200 may supply the auxiliary power IGN2 when a watchdog timer is reset. In this case, the watchdog indicates that the timer is reset at a specified time to prevent the processor 110 from malfunctioning and falling into an infinite routine.

That is, the auxiliary power source controller 200 senses whether the processor 110 operates normally through the watchdog timer of the watchdog circuit. The auxiliary power source controller 200 provides the control circuit 150 with the auxiliary power IGN2 to forcibly terminate the boost mode when the processor 110 is reset.

In addition, the auxiliary power source controller 200 may supply the auxiliary power IGN2 to a warning display 210 to display a warning signal indicating the failure of the processor 110. For example, when the processor 110 fails, a phrase "Entering the ISG mode cannot be entered (go to a nearby repair shop)" is displayed on the warning display 210 to allow the driver to recognize that the processor 110 has failed. In this case, the warning display 210 may include a cluster for displaying error information to a driver through a display of the vehicle. In some exemplary embodiments, the warning display 210 may display the warning signal through CAN communication with the auxiliary power source controller 200.

Figure 5:
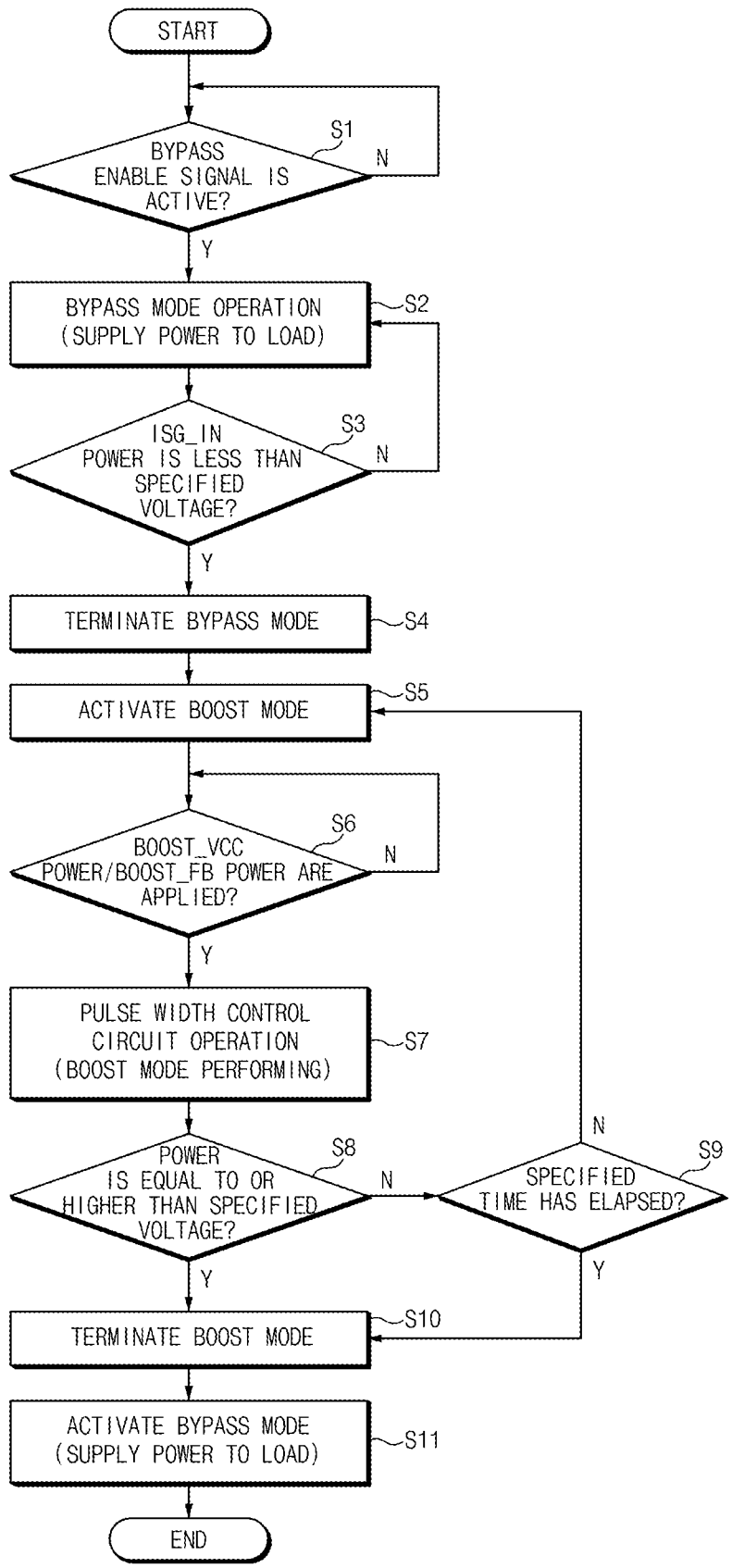
FIGS. 5 and 6 are flowcharts illustrating a method of managing power of a vehicle according to an exemplary embodiment of the present disclosure.

FIG. 5 is a flowchart illustrating a normal operation of the power management apparatus 100 of FIG. 2.

Referring to the flowchart of FIG. 5, in S1, the processor 110 activates the bypass enable signal BYPASS_EN when the idle mode signal ISG_IN is inactive. Then, when the bypass mode is entered, the switching device 120 and the bypass switch 130 are turned on. Thus, in S2, the input power B_IN is bypassed along the bypass path P1, such that the output power B_OUT is supplied to each of the loads 20 to 24.

Thereafter, the processor 110 determines whether the idle mode signal ISG_IN is input in the active state. Then, in S3, the processor 110 determines whether the input power B_IN is less than a specified voltage (e.g., 12 V) (whether it is in a voltage drop state).

When the idle mode signal ISG_IN is active and the input power B_IN is less than a certain voltage (e.g., 12V), in S4, the processor 110 deactivates the bypass enable signal BYPASS_EN to terminate the bypass mode.

Then, the processor 110 activates the enable signal EN to enter the boost mode in S5. The control circuit 150 generates the boost voltage BOOST_VCC and the distribution voltage BOOST_FB corresponding to the enable signal EN in S6.

Next, the pulse width control circuit 160 performs the pulse width modulation operation by the boost voltage BOOST_VCC and the distribution voltage BOOST_FB. In addition, the booster 140 performs the boosting operation by the driving device 170 and the boost controller 180 in the boost mode in S7.

The pulse width control circuit 160 performs the pulse width control operation until the input power B_IN is boosted to a specified voltage (e.g., 12V). When the booster 140 operates by the pulse width control circuit 160 and the driving device 170, the input power B_IN is boosted and the boosted power B_OUT is output.

Thereafter, in S8, the processor 110 determines whether the level of the input power B_IN is equal to or higher than a specified voltage (e.g., 12 V). When the level of the input power B_IN is not equal to or higher than a specified voltage, in S9, the processor 110 determines whether a specified time (e.g., one second) has elapsed.

When it is determined in step S9 that the specified time has not elapsed, the process returns to S5 to maintain the boost mode activation operation. Moreover, when the input power B_IN is equal to or higher than a specified voltage in S8 and the input power B_IN is less than a specified voltage in step S9 but a specified time has elapsed, the boost mode is terminated in S10.

The processor 110 deactivates the enable signal EN when the input power B_IN is equal to or higher than a specified voltage. Thus, the operation of the control circuit 150 is terminated and the boost voltage BOOST_VCC and the distribution voltage BOOST_FB are no longer supplied to the pulse width control circuit 160 and the driving device 170. Thereafter, the bypass mode is entered again and the output power B_OUT is supplied to each of the loads 20 to 24 in S11.

Figure 6:
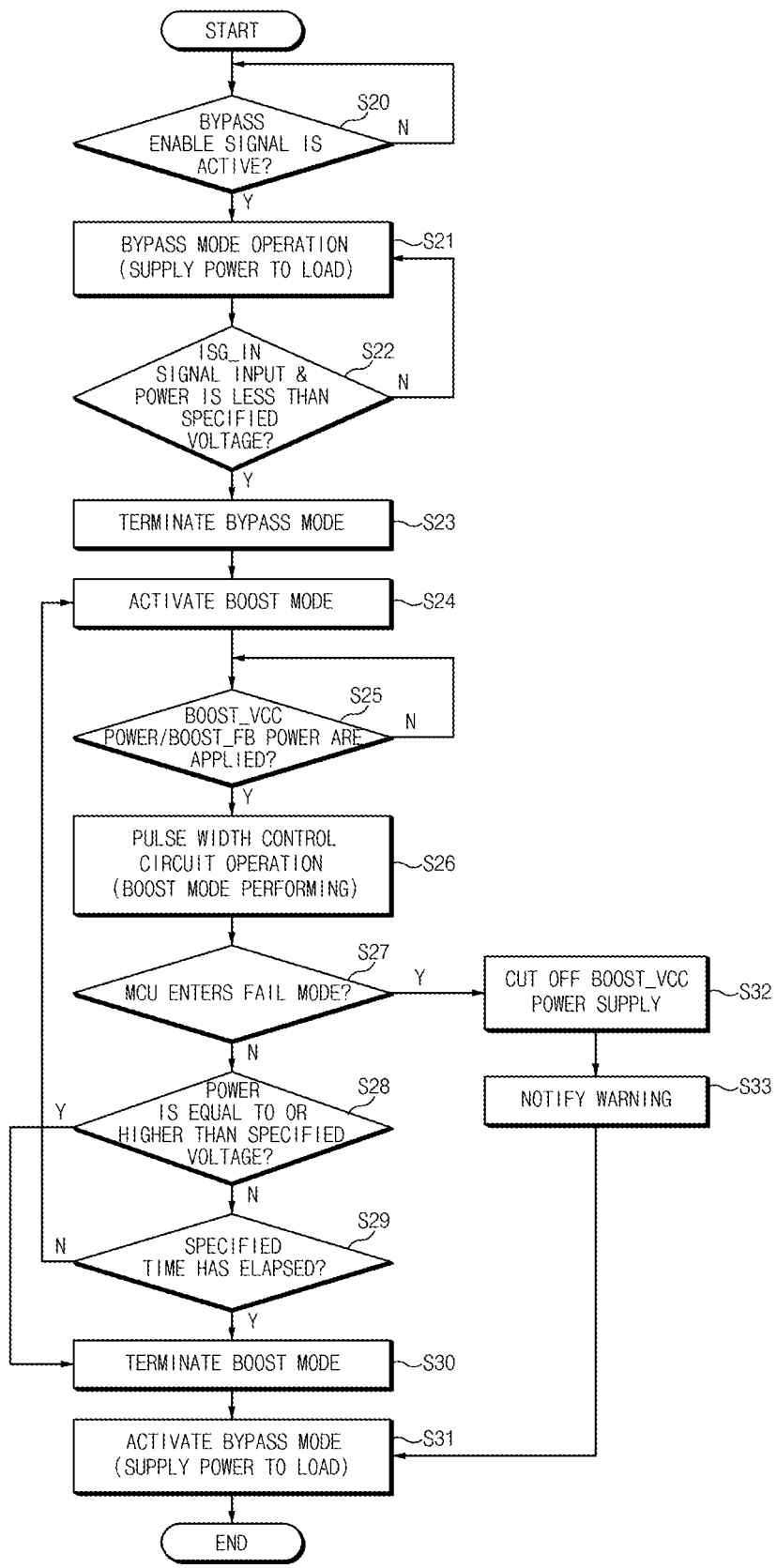

FIG. 6 is a flowchart illustrating an abnormal operation related to the power management apparatus 100 of FIG. 2. In FIG. 6 according to an exemplary embodiment of the present disclosure, because S20 to S26 are the same as S1 to S7 of FIG. 5, the duplicate description will be omitted.

Referring to the flowchart of FIG. 6, in S27, the auxiliary power source controller 200 determines whether the processor 110 is in the fail mode. When the processor 110 is not in the fail mode, the processor 110 determines whether the input power B_IN is equal to or higher than a specified voltage (e.g., 12 V) in S28. When the input power B_IN is not equal to or higher than the specified voltage, in S29, the processor determines whether a specified time has elapsed.

When it is determined in step S29 that the specified time has not elapsed, the process returns to S24 to maintain the boost mode activation operation. Moreover, when the input power B_IN is equal to or higher than the specified voltage in S28 and the input power B_IN is less than the specified voltage in S29 but a specified time has elapsed, the boost mode is terminated in S30. Then, the bypass moth is entered again and the power B_OUT is supplied to each of the loads 20 to 24 in S31.

When the failure of the processor 110 occurs in the boost mode in S27, the enable signal EN may be continuously maintained in an active state for a specified time or more. In this case, the boost voltage BOOST_VCC and the distribution voltage BOOST_FB are continuously supplied to the pulse width control circuit 160 and the driving device 170, so that the elements of the booster 140 may be damaged.

Accordingly, when the processor 110 is in the fail mode in S27, the auxiliary power source controller 200 activates the auxiliary power IGN2. As a result, the power blocking device 154 is operated to terminate the operation of the control circuit 150. Then, the boost voltage BOOST_VCC and the distribution voltage BOOST_FB are no longer supplied to the pulse width control circuit 160 and the driving device 170 in S32. Further, the auxiliary power source controller 200 supplies the auxiliary power IGN2 to the warning display 210 to display a warning signal indicating the failure of the processor 110 in S33.

According to exemplary embodiments of the present disclosure, the power management apparatus and the function of the low-voltage DC-DC converter are implemented in the integrated form, thereby efficiently managing power, reducing the weight, and increasing space utilization in the vehicle.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

Therefore, the exemplary embodiments of the present disclosure are provided to explain the spirit and scope of the present disclosure, but not to limit them, so that the spirit and scope of the present disclosure is not limited by the exemplary embodiments. The scope of the present disclosure should be construed on the basis of the accompanying claims, and all the technical ideas within the scope equivalent to the claims should be included in the scope of the present disclosure.

What is claimed is:

1. An apparatus for managing power of a vehicle, the apparatus comprising:
   a processor configured to control a bypass path for bypassing an input power or a boosting path for boosting the input power corresponding to an idle mode signal;
   a booster configured to boost the input power corresponding to a driving signal to generate an output power;
   a control circuit configured to selectively supply a power for operating the booster corresponding to an output signal of the processor in a boost mode; and
   a pulse width control circuit configured to control a duty of the driving signal corresponding to an output signal of the control circuit,
   wherein the control circuit includes:
   a driving controller selectively operated corresponding to a control signal applied from the processor;
   a driving device driven corresponding to an output signal of the driving controller to selectively supply a boost voltage corresponding to an output voltage; and
   a resistance dividing device configured to resistance-divide the boost voltage to generate a divided voltage.

2. The apparatus of claim 1, wherein the processor, the booster, the control circuit, and the pulse width control circuit are implemented in an integrated module form.

3. The apparatus of claim 1, further comprising:
   a bypass switch configured to selectively connect the input power and the output power to each other; and
   a switching device configured to selectively control a connection of the bypass switch corresponding to control of the processor.

4. The apparatus of claim 1, further comprising:
   a driving device configured to generate the driving signal corresponding to output signals of the pulse width control circuit and the control circuit; and
   a boost controller configured to selectively control an operation of the booster corresponding to an output signal of the driving device.

5. The apparatus of claim 1, wherein the bypass path and the boosting path are complementarily operated.

6. The apparatus of claim 1, wherein the processor is further configured to activate a bypass enable signal for forming the bypass path when the idle mode signal is inactivated and to activate a control signal for forming the boosting path when the idle mode signal is activated.

7. The apparatus of claim 6, wherein the processor is further configured to block the bypass path and to enter the boost mode when the idle mode signal is activated and a voltage of the input power is less than a specified voltage.

8. The apparatus of claim 6, wherein the processor is further configured to inactivate the control signal to block the boosting path when a voltage of the input power is equal to or higher than a specified voltage in the boost mode.

9. The apparatus of claim 1, wherein the processor is further configured to block the boosting path and to form the bypass path when a voltage of the input power is equal to or less than a specified voltage for a specified time or more.

10. The apparatus of claim 1, wherein the booster includes:
    a plurality of inductors connected in series between an input terminal of the input power and an output terminal of the output power; and
    a plurality of capacitors connected between each connecting terminal of the plurality of inductors and a ground voltage terminal.

11. The apparatus of claim 1, wherein the control circuit further includes a power blocking device configured to selectively control whether to supply the boost voltage corresponding to a fail mode of the processor.

12. The apparatus of claim 11, wherein the power blocking device is turned on by an ignition signal in a sleep mode of the vehicle to block the boost voltage supplied to the pulse width control circuit.

13. The apparatus of claim 11, further comprising:
    an auxiliary power source configured to generate an auxiliary power for turning on the power blocking device by detecting a failure of the processor.

14. The apparatus of claim 13, further comprising:
    a warning display device configured to indicate whether the processor is failed according to the auxiliary power source.

15. A method of managing power of a vehicle, the method comprising:
    supplying an output power to a load of the vehicle corresponding to an input power in a bypass mode;
    terminating the bypass mode and activating a boost mode when an idle mode signal is activated and the input power is less than a specified voltage; and
    terminating the boost mode and activating the bypass mode when the input power is equal to or higher than the specified voltage,
    wherein the supplying an output power to a load of the vehicle corresponding to an input power in a bypass mode includes:
    selectively operating corresponding to a control signal;
    selectively supplying a boost voltage corresponding to an output voltage; and
    resistance-dividing the boost voltage to generate a divided voltage.

16. The method of claim 15, further comprising:
    terminating the boost mode when the input power is equal to or less than the specified voltage for a specified time or more.

17. The method of claim 15, further comprising:
    blocking supply of a boost power and entering the bypass mode when a failure of a processor is sensed in the boost mode.

18. The method of claim 17, further comprising:
    displaying the failure of the processor on a display.

19. The method of claim 15, further comprising:
    controlling a duty of a driving signal by a pulse width modulation operation in the boost mode and boosting the input power corresponding to the driving signal.

* * * * *